US012632672B2

(12) United States Patent (10) Patent No.: US 12,632,672 B2
Nishida et al. (45) Date of Patent: May 19, 2026

(54) LEARNING APPARATUS, LEARNING METHOD AND PROGRAM

(71) Applicant: NTT, Inc., Tokyo (JP)

(72) Inventors: Kosuke Nishida, Tokyo (JP); Kyosuke Nishida, Tokyo (JP); Sen Yoshida, Tokyo (JP)

(73) Assignee: NTT, Inc., Tokyo (JP)

( * ) Notice: Subject to any disclaimer, the term of this patent is extended or adjusted under 35 U.S.C. 154(b) by 228 days.

(21) Appl. No.: 18/280,181

(22) PCT Filed: Mar. 8, 2021

(86) PCT No.: PCT/JP2021/009049
§ 371 (c)(1),
(2) Date: Sep. 1, 2023

(87) PCT Pub. No.: WO2022/190178
PCT Pub. Date: Sep. 15, 2022

(65) Prior Publication Data
US 2024/0054295 A1 Feb. 15, 2024

(51) Int. Cl.
*G06F 40/40* (2020.01)
*G06N 3/0455* (2023.01)

(52) U.S. Cl.
CPC ........... *G06F 40/40* (2020.01); *G06N 3/0455* (2023.01)

(58) Field of Classification Search
CPC ...... G06F 40/40; G06F 40/242; G06F 40/279; G06F 40/20; G06F 40/284; G06N 3/0455; G06N 3/084; G06N 3/09
See application file for complete search history.

(56) References Cited

U.S. PATENT DOCUMENTS 10,699,060 B2 * 6/2020 McCann .................. G06N 3/08
2023/0244879 A1 * 8/2023 Zhang ................... G06F 16/355
704/9

FOREIGN PATENT DOCUMENTS

CN 111914551 A * 11/2020 ........... G06F 16/355
CN 113536800 A * 10/2021 ............. G06N 3/048

OTHER PUBLICATIONS

Gururangan et al. (2020) "Don't stop pretraining: Adapt language models to domains and tasks," In ACL, pp. 8342-8360, Jul. 2020.
Devlin et al. (2019) "BERT: Pre-training of deep bidirectional transformers for language understanding," NAACL-HLT, pp. 4171-4186.
Lee et al. (2020) "Biobert: a pre-trained biomedical language representation model for biomedical text mining," Bioinformatics, vol. 36, No. 4, pp. 1234-1240.
Mikolov et al. (2013) "Efficient Estimation of Word Representations," in Vector Space, pp. 1-12.
Bojanowski et al. (2017) "Enriching word vectors with subword information," Transactions of the Association for Computational Linguistics, vol. 5, pp. 135-146.

(Continued)

*Primary Examiner* — Linda Wong

(57) ABSTRACT

A learning apparatus includes a memory and at least one processor connected to the memory, wherein the processor configured to: convert input text data into a feature amount sequence based on a language model; and update parameters of the language model based on the text data, the feature amount sequence, and a word vector learned in advance.

8 Claims, 10 Drawing Sheets

(56)     References Cited

OTHER PUBLICATIONS

Tsatsaronis et al. (2015) "An overview of the BIOASQ large-scale biomedical semantic indexing and question answering competition," BMCBioinformatics, vol. 16, p. 138.

Rajpurkar et al. (2016) "SQuAD: 100,000+ questions for machine comprehension of text," In EMNLP, pp. 2383-2392.

* cited by examiner

Fig. 6

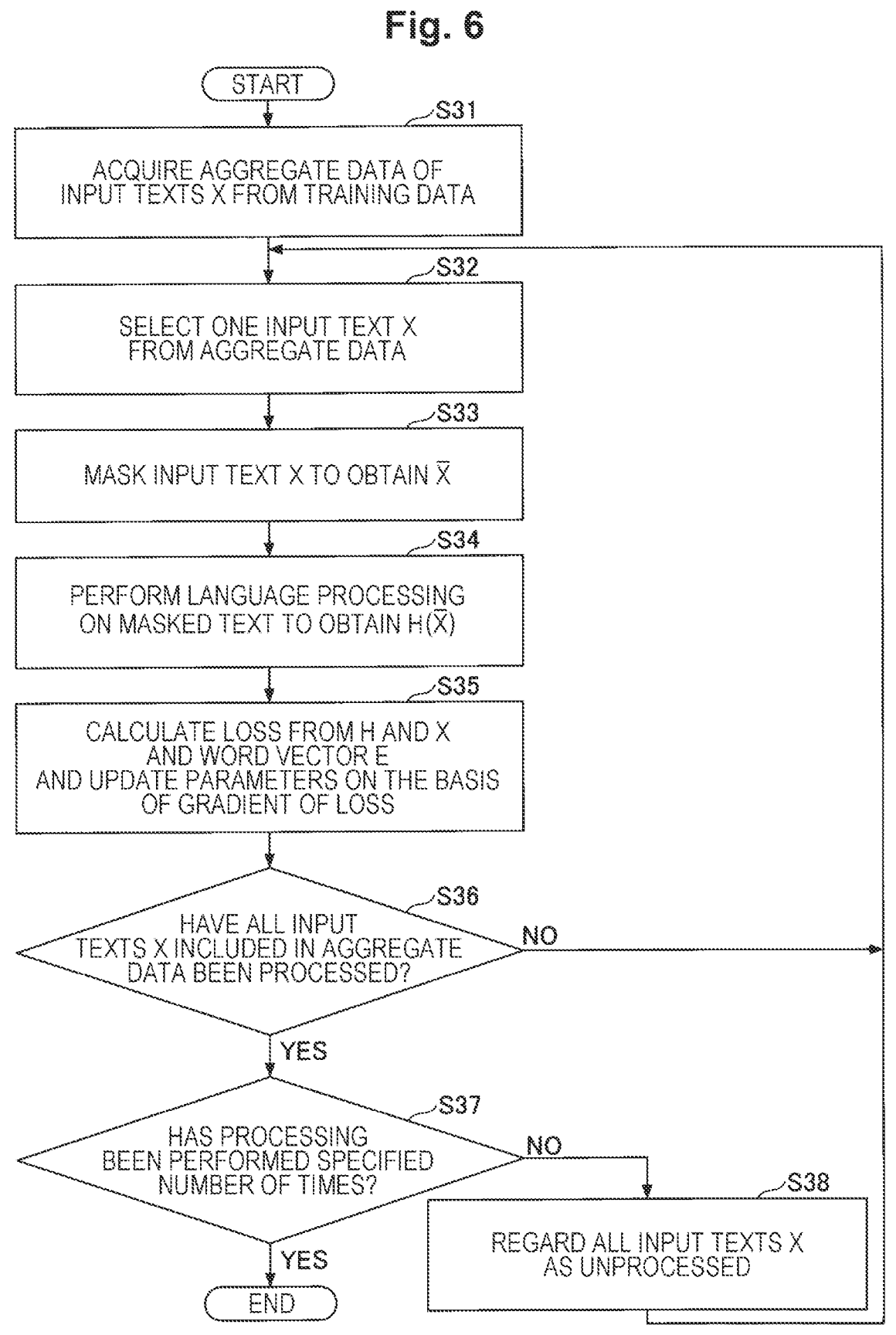

START

S31
ACQUIRE AGGREGATE DATA OF
INPUT TEXTS X FROM TRAINING DATA

S32
SELECT ONE INPUT TEXT X
FROM AGGREGATE DATA

S33
MASK INPUT TEXT X TO OBTAIN $\bar{X}$

S34
PERFORM LANGUAGE PROCESSING
ON MASKED TEXT TO OBTAIN $H(\bar{X})$

S35
CALCULATE LOSS FROM H AND X
AND WORD VECTOR E
AND UPDATE PARAMETERS ON THE BASIS
OF GRADIENT OF LOSS

S36
HAVE ALL INPUT
TEXTS X INCLUDED IN AGGREGATE
DATA BEEN PROCESSED? — NO

YES

S37
HAS PROCESSING
BEEN PERFORMED SPECIFIED
NUMBER OF TIMES? — NO

YES

S38
REGARD ALL INPUT TEXTS X
AS UNPROCESSED

END

LEARNING APPARATUS, LEARNING METHOD AND PROGRAM

CROSS-REFERENCE TO RELATED APPLICATIONS

This application is a U.S. 371 Application of International Patent Application No. PCT/JP2021/009049, filed on 8 Mar. 2021, the disclosure of which is hereby incorporated herein by reference in its entirety.

TECHNICAL FIELD

The present invention relates to a learning apparatus, a learning method, and a program.

BACKGROUND ART

It is known that a pre-learned language model, which is a model learned in advance (pre-learning 1) using an enormous corpus, exhibits high performance in various tasks of natural language processing. Generally, learning of pre-learning 1 requires enormous calculation resources. The pre-learned language model using the corpus related to general domains is publicly available, and hence, the pre-learned language model can be downloaded and used. However, in a case where a target task belongs to a specialized domain such as medical care and law, a pre-learned language model specialized in the specialized domain is not publicly available, and thus, if it is tried to perform learning in the pre-learning 1 using a corpus specialized in the specialized domain, it requires an enormous learning period.

Thus, attempts have been made to obtain a learning model specialized in a specialized domain with higher performance in a short learning period. For example, Non-Patent Literature 1 discloses a method for performing pre-learning 2 using training data of a target task between the pre-learning 1 and Fine-Tuning. Note that Fine-Tuning is a procedure of performing learning using training data of a target task and retraining a language model into a model for the target task.

CITATION LIST

Non-Patent Literature

Non-Patent Literature 1: Suchin Gururangan, Ana Marasovic, SwabhaSwayamdipta, Kyle Lo, Iz Beltagy, Doug Downey, and Noah A. Smith. Don't stop pre-training: Adapt language models to domains and tasks. In ACL, pp. 8342-8360, July 2020.

SUMMARY OF INVENTION

Technical Problem

However, the language model according to Non-Patent Literature 1 still does not have sufficient performance as compared with the performance or the like of a pre-learned language model specialized in a specialized domain.

An object of the disclosed technology is to obtain a language model with higher performance while preventing increase of a learning period.

Solution to Problem

The disclosed technology is a learning apparatus including: a conversion unit configured to convert input text data into a feature amount sequence based on a language model; and a parameter update unit configured to update parameters of the language model based on the text data, the feature amount sequence, and a word vector learned in advance.

Advantageous Effects of Invention

It is possible to obtain a language model with higher performance while preventing increase of a learning period.

BRIEF DESCRIPTION OF DRAWINGS

FIG. 6 is a flowchart illustrating an example of a flow of parameter update processing of pre-learning 2 according to the present embodiment.

DESCRIPTION OF EMBODIMENTS

Hereinafter, an embodiment of the present invention (present embodiment) will be described with reference to the drawings. The embodiment described below is merely an example, and embodiments to which the present invention is applied are not limited to the following embodiment.

In the following description, Reference Literatures will be indicated as [1], [2], and the like. The Reference Literatures are listed at the end of the specification. Note that, in the present specification, a character in which "-" is described above X is written as "¯X".

Functional Configuration of Learning Apparatus

A learning apparatus 10 according to the present embodiment updates parameters of a language model through machine learning using word vectors.

Figure 1:
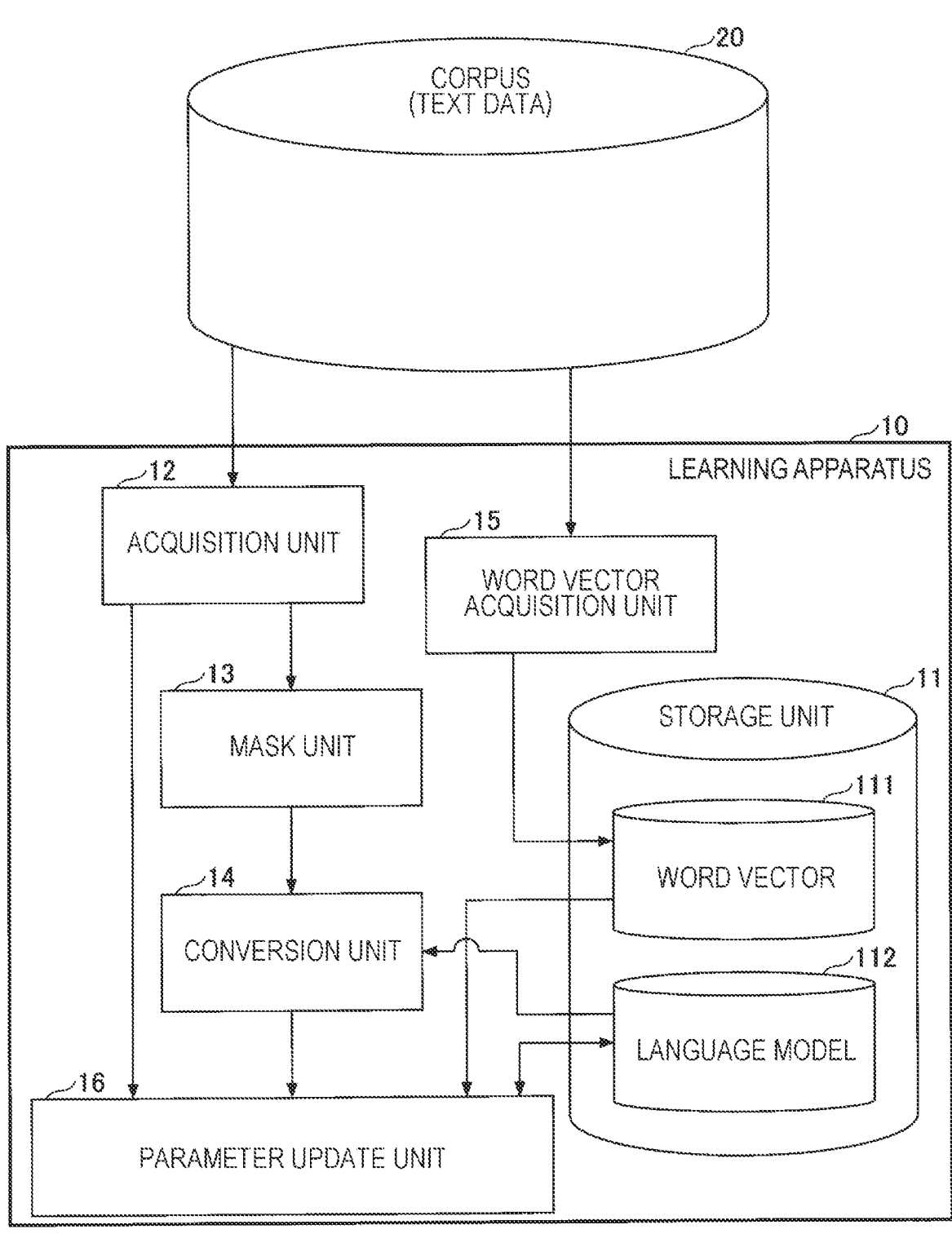
FIG. 1 is a first view illustrating a functional configuration of a learning apparatus.
Figure 2:
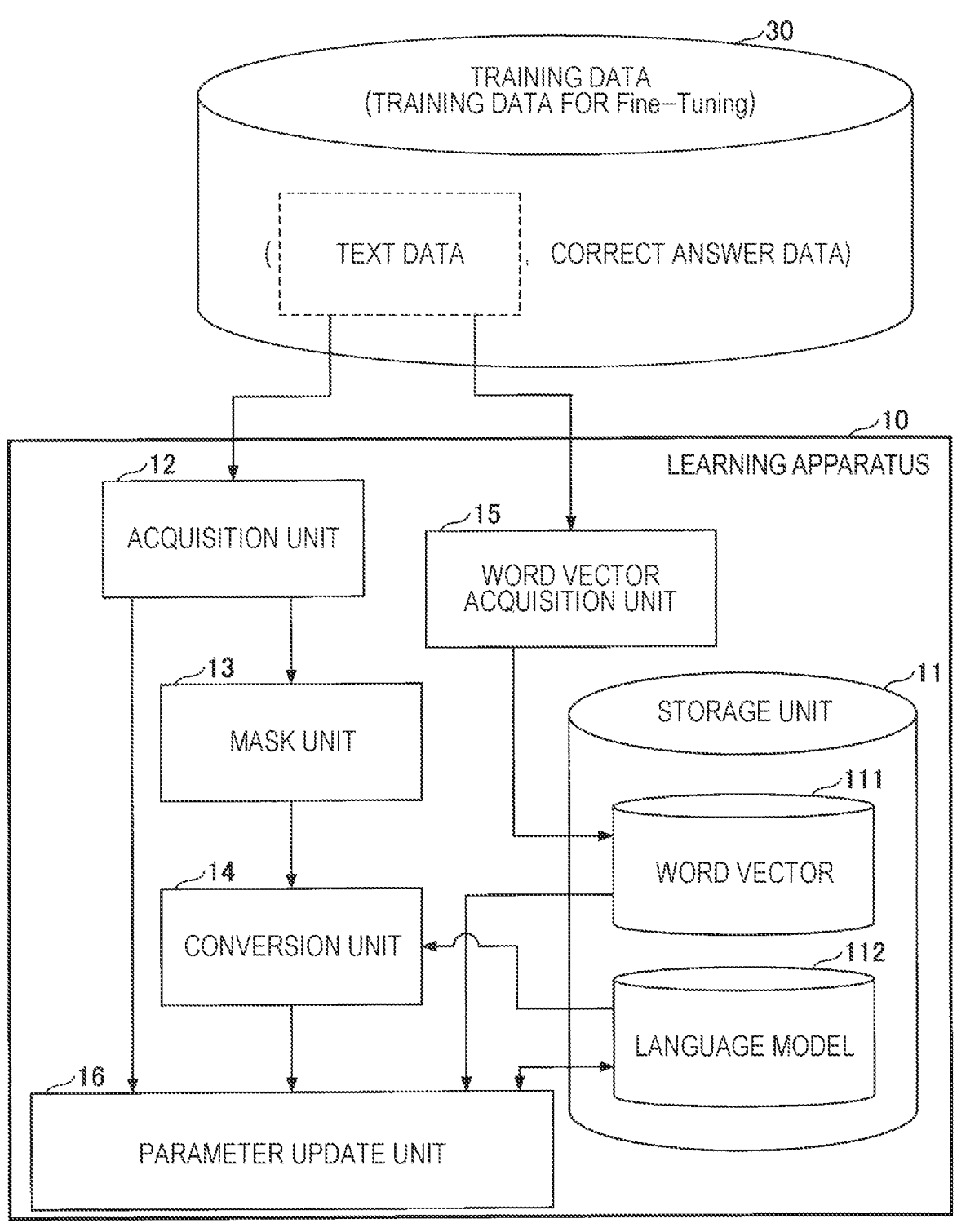
FIG. 2 is a second view illustrating a functional configuration of the learning apparatus.
Figure 3:
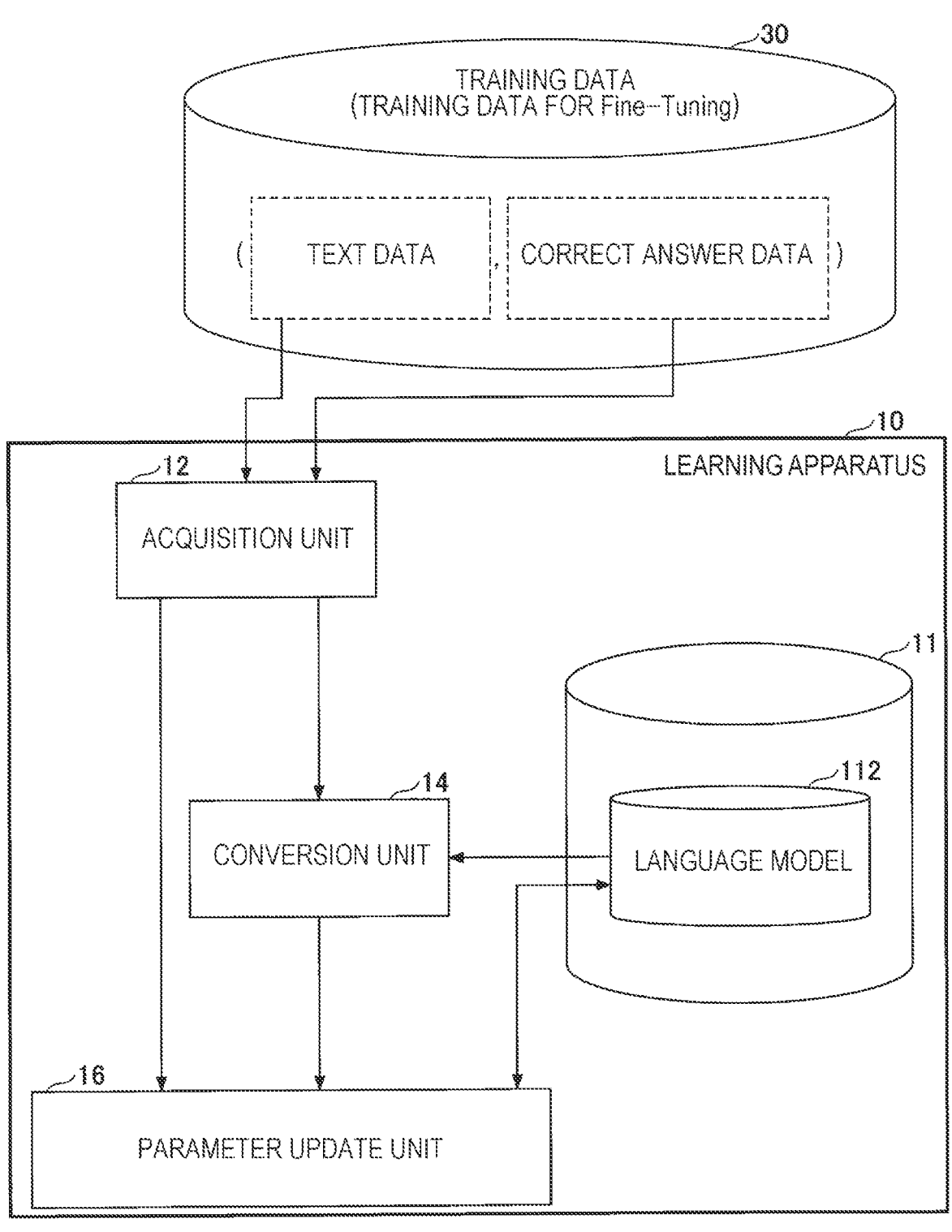
FIG. 3 is a third view illustrating a functional configuration of the learning apparatus.

FIGS. 1 to 3 are views illustrating functional configurations of the learning apparatus.

The learning apparatus 10 is a device for learning a language model 112. The language model 112 to be learned is provided to convert an input text sequence into a feature amount sequence (having a sequence length of 1 or greater). The learning apparatus 10 learns the language model 112 as illustrated in FIG. 1 or 2 and performs Fine-Tuning using training data of a target task as illustrated in FIG. 3 on the learned language model 112 (learned language model). As a result, a model corresponding to any target task can be obtained. Note that the target task is, for example, text classification, text extraction such as reading, text generation such as translation or summarization, or the like.

Specifically, the learning apparatus 10 updates parameters of the language model 112 by executing machine learning based on text extracted from a corpus 20 as illustrated in FIG. 1 (hereinafter, referred to as pre-learning 1), machine learning based on text data extracted from training data 30 as illustrated in FIG. 2 (hereinafter, referred to as pre-learning 2), Fine-Tuning based on text data extracted from the training data 30 and correct answer data as illustrated in FIG. 3 or the like.

The corpus 20 is an aggregate of text data related to a general domain (topic/field) or a specialized domain.

The training data 30 is training data for Fine-Tuning. The training data 30 is data in which input text is associated with correct answer data.

The learning apparatus 10 includes a storage unit 11, an acquisition unit 12, a mask unit 13, a conversion unit 14, a word vector acquisition unit 15, and a parameter update unit 16.

The storage unit 11 stores various data, specifically, stores the language model 112 and a word vector 111.

The acquisition unit 12 acquires text data from the corpus 20 in the pre-learning 1 and acquires text data included in training data of the target task from the training data 30 in the pre-learning 2. In addition, in Fine-Tuning, the acquisition unit 12 acquires training data of the target task from the training data 30. Note that in the pre-learning 2, the correct answer data included in the training data 30 is unnecessary, and thus, the acquisition unit 12 may acquire text data of the same domain as the training data 30 from data other than the training data 30 or the like, instead of the text data included in the training data 30 of the target task.

The mask unit 13 masks part of the input text acquired from the training data 30 in the pre-learning 1 or the pre-learning 2. The mask unit 13 executes masking processing in a method called a masking language model [2].

In Fine-Tuning, the conversion unit 14 converts the text data acquired by the acquisition unit 12. Furthermore, the conversion unit 14 converts the text data masked by the mask unit 13 in the pre-learning 1 or the pre-learning 2.

The word vector acquisition unit 15 acquires word vectors to be used in the pre-learning 1 or the pre-learning 2. The word vector is a vector expressing meaning of a word, and word2vec[4] and the like are known. According to the word vector, it is known that meaning of a word can be expressed on a vector space, for example, when a vector representing "man" is subtracted from a vector representing "king" and a vector representing "woman" is added, a vector close to a vector representing "queen" appears.

Specifically, the word vector acquisition unit 15 may acquire a word vector already generated as a word vector specialized for a domain belonging to the target task or may acquire a word vector by machine learning based on a corpus or the like.

In a case where the word vector is acquired by machine learning, the word vector acquisition unit 15 acquires a word vector representing the meaning of the word in the domain of the target task by learning the word vector using an aggregate of input texts of the training data of the target task as a corpus.

The word vector acquisition unit 15 can use any method as the word vector learning method. In particular, fastText[5] is known as a method that enables learning from a small corpus. It is possible to efficiently acquire word vectors in a target task by executing learning on fastText with respect to an aggregate of input texts of training data of the target task using a publicly available word vectors of fastText as initial values.

Note that the learning apparatus 10 does not need to include the word vector acquisition unit 15, and for example, another device (for example, a word vector acquisition device) may have the same function as the word vector acquisition unit 15.

The parameter update unit 16 updates parameters of the language model 112 in the pre-learning 1, the pre-learning 2, or Fine-Tuning.

Pre-Learning 1 in Related Art

Figure 4:
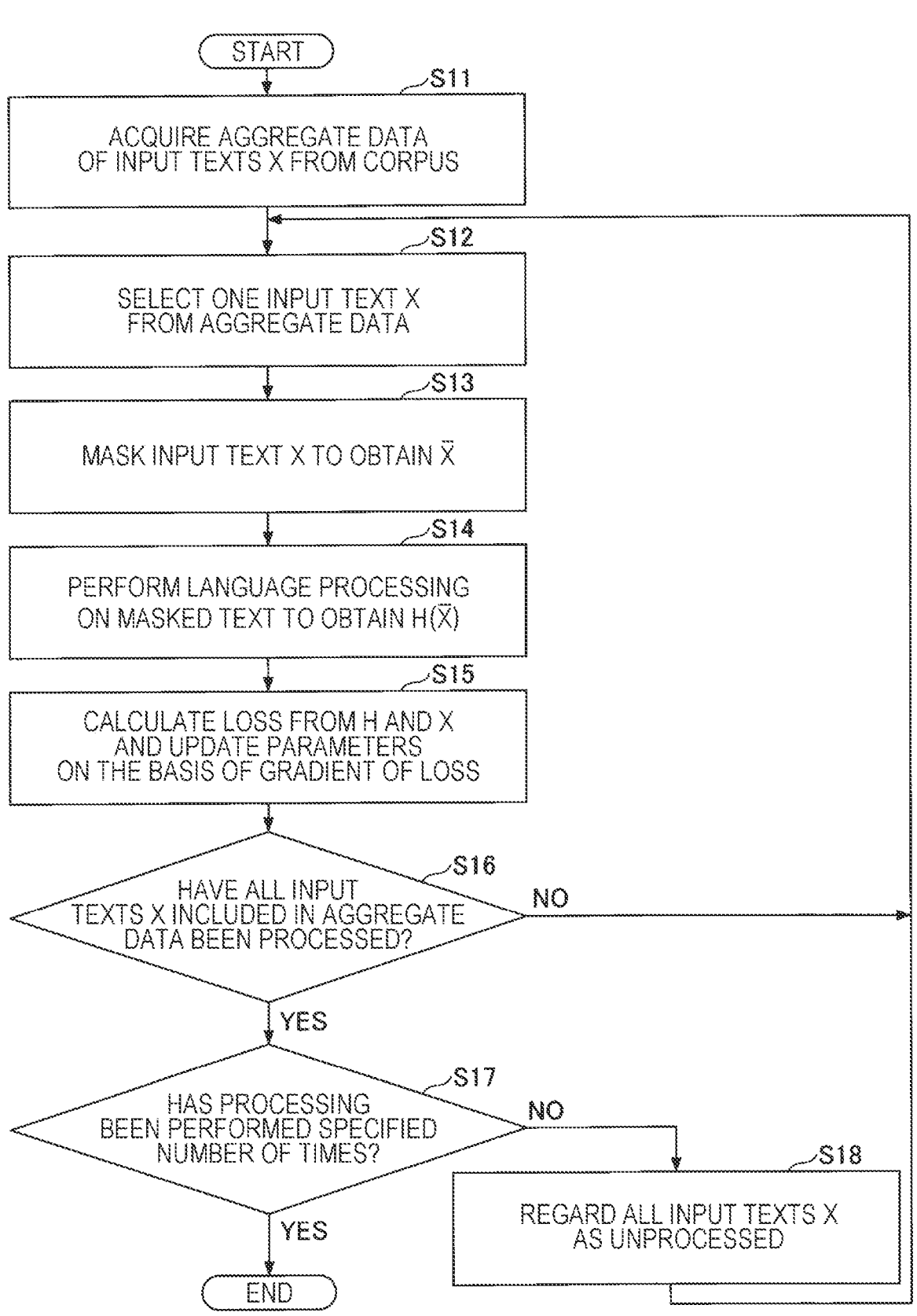
FIG. 4 is a flowchart illustrating an example of a flow of parameter update processing of pre-learning 1 in related art.

Next, pre-learning 1 in related art as a premise for comparison will be described. FIG. 4 is a flowchart illustrating an example of a flow of parameter update processing of the pre-learning 1 in related art.

In the pre-learning 1 in related art, the acquisition unit 12 acquires aggregate data of input texts X from the corpus 20 (step S11). Next, the learning apparatus 10 selects one input text X from the aggregate data as a processing target (step S12). The mask unit 13 masks the input text X to obtain a masked text $^-$X (step S13).

The conversion unit 14 converts the masked text based on the parameters of the language model 112 stored in the storage unit 11 to obtain a feature amount sequence H($^-$X) (step S14).

The parameter update unit 16 calculates a loss from the feature amount sequence H and the input text X, and updates the parameters of the language model 112 stored in the storage unit 11 based on a gradient of the loss (step S15).

The learning apparatus 10 determines whether or not all the input texts X included in the aggregate data have been processed (step S16). In a case where the learning apparatus 10 determines that any of the input texts X included in the aggregate data is not processed (step S16: No), the processing returns to the processing in step S12, and the learning apparatus 10 selects the next input text X.

In a case where the learning apparatus 10 determines that all the input texts X included in the aggregate data have been processed (step S16: Yes), the learning apparatus 10 further determines whether processing has been performed a specified number of times (step S17). In a case where the learning apparatus 10 determines that the processing has not been performed the specified number of times (step S17: No), the learning apparatus 10 regards all the input texts X as unprocessed (step S18), and the processing returns to the processing in step S12.

In a case where the learning apparatus 10 determines that the processing has been performed the specified number of times (step S18: Yes), the processing ends.

Pre-Learning 2 in Related Art

Figure 5:
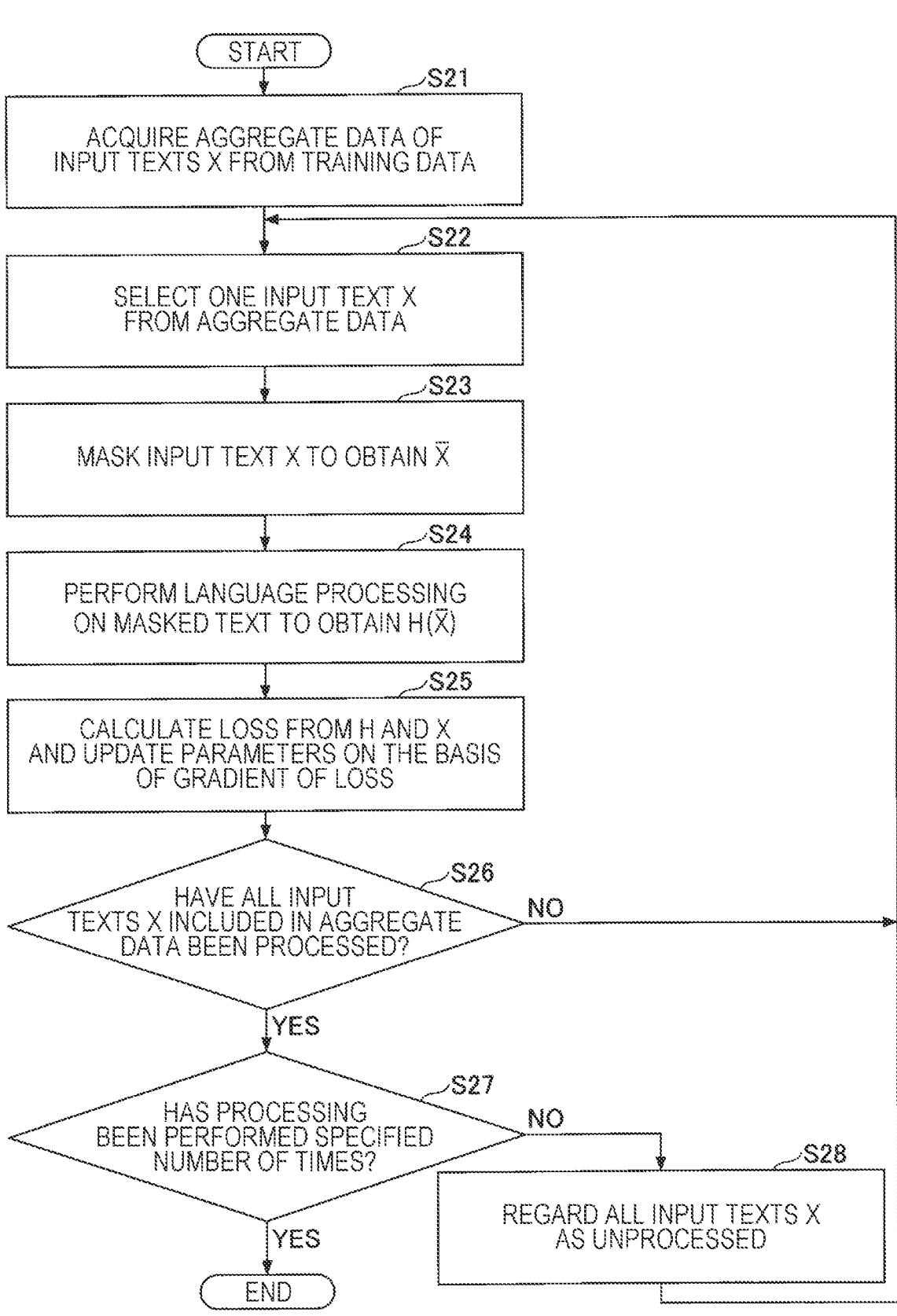
FIG. 5 is a flowchart illustrating an example of a flow of parameter update processing of pre-learning 2 in related art.

FIG. 5 is a flowchart illustrating an example of a flow of parameter update processing of the pre-learning 2 in related art. The pre-learning 2 is executed for the learned language model 112 of the pre-learning 1.

The acquisition unit 12 acquires the aggregate data of the input texts X from the training data 30 (step S21). Next, the learning apparatus 10 selects one input text X from the aggregate data as a processing target (step S22). The mask unit 13 masks the input text X to obtain a masked text $^-$X (step S23).

The conversion unit 14 converts the masked text based on the parameters of the language model 112 stored in the storage unit 11 to obtain a feature amount sequence H(⁻X) (step S24).

The parameter update unit 16 calculates a loss from the feature amount sequence H and the input text X, and updates the parameters of the language model 112 stored in the storage unit 11 based on a gradient of the loss (step S25).

The learning apparatus 10 determines whether or not all the input texts X included in the aggregate data have been processed (step S26). In a case where the learning apparatus 10 determines that any of the input texts X included in the aggregate data is not processed (step S26: No), the processing returns to the processing in step S22, and the learning apparatus 10 selects the next input text X.

In a case where the learning apparatus 10 determines that all the input texts X included in the aggregate data have been processed (step S26: Yes), the learning apparatus 10 further determines whether processing has been performed a specified number of times (step S27). In a case where the learning apparatus 10 determines that the processing has not been performed the specified number of times (step S27: No), the learning apparatus 10 regards all the input texts X as unprocessed (step S28), and the processing returns to the processing in step S22.

In a case where the learning apparatus 10 determines that the processing has been performed the specified number of times (step S27: Yes), the processing ends.

Pre-Learning 2 According to the Present Embodiment

FIG. 6 is a flowchart illustrating an example of a flow of parameter update processing of the pre-learning 2 according to the present embodiment. The pre-learning 2 according to the present embodiment is executed for the learned language model 112 of the pre-learning 1 in related art. Hereinafter, the pre-learning 2 will be referred to as "pre-learning 2 in related art" or "pre-learning 2 according to the present embodiment" in a case where it is necessary to distinguish between the related art and the present embodiment. The description common to both will be referred to as "pre-learning 2".

The acquisition unit 12 acquires aggregate data of the input texts X and output texts Y from the training data 30 (step S31). Here, a domain of the input text X is the same as a domain of the text to be processed in the target task. Next, the learning apparatus 10 selects one input text X from the aggregate data as a processing target (step S32). The mask unit 13 masks the input text X to obtain a masked text ⁻X (step S33).

The conversion unit 14 converts the masked text based on the parameters of the language model 112 stored in the storage unit 11 to obtain a feature amount sequence H(⁻X) (step S34).

The parameter update unit 16 calculates a loss from the feature amount sequence H, the input text X, and a word vector E, and updates the parameters of the language model 112 stored in the storage unit 11 based on a gradient of the loss (step S35). Here, the parameter update unit 16 uses the word vector acquired by the word vector acquisition unit 15. A specific parameter update method will be described later.

The learning apparatus 10 determines whether or not all the input texts X included in the aggregate data have been processed (step S36). In a case where the learning apparatus 10 determines that any of the input texts X included in the aggregate data is not processed (step S36: No), the processing returns to the processing in step S32, and the learning apparatus 10 selects the next input text X.

In a case where the learning apparatus 10 determines that all the input texts X included in the aggregate data have been processed (step S36: Yes), the learning apparatus 10 further determines whether processing has been performed a specified number of times (step S37). In a case where the learning apparatus 10 determines that the processing has not been performed the specified number of times (step S37: No), the learning apparatus 10 regards all the input texts X as unprocessed (step S38), and the processing returns to the processing in step S32.

In a case where the learning apparatus 10 determines that the processing has been performed the specified number of times (step S37: Yes), the processing ends.

Note that in the pre-learning 1 and the pre-learning 2 in related art and the pre-learning 2 according to the present embodiment, a method called a masked language model is adopted. In the masked language model, a vocabulary is V, and a text is a sequence of words $X \in V^l$, where l is a word sequence length. An input of the masked language model is a sequence ⁻X in which a perturbation (such as a masking part of tokens) is given to X. The masked language model is a language model that predicts a token sequence X before perturbation from ⁻X.

An output of the masked language model is a matrix:

$$H(\bar{X}) \in \mathbb{R}^{V \times l} \qquad \text{[Math. 1]}$$

and $h_{vt}(\bar{X})$ is a feature amount including a score that the t-th word $x_t$ of X is $v \in V$. The objective function of the masked language model is expressed as the following loss, where T is an aggregate of positions of perturbed tokens.

$$L_{MLM} = -\sum_{t \in T} \log \frac{\exp(h_{x_t t}(\bar{X}))}{\sum_v \exp(h_{vt}(\bar{X}))} \qquad \text{[Math. 2]}$$

Next, parameter update processing in step S35 of the pre-learning 2 according to the present embodiment will be described in detail. It is assumed that intermediate representation of the language model 112 is $$Z \in \mathbb{R}^{d_1 \times l} \qquad \text{[Math. 3]}$$

where $d_1$ is the dimension of the intermediate representation. As Z, an intermediate representation of any language model is available. While an output of a word embedding layer is used here, an output of any layer can be used. Note that the intermediate representation may include a representation of each layer including a final layer. Note that a prediction score of the final layer may also be considered as the intermediate representation because the prediction score is subsequently subjected to linear conversion processing to the dimension of the number of vocabularies.

A matrix of word vectors acquired by the word vector acquisition unit 15 is expressed as follows:

$$E \in \mathbb{R}^{d_2 \times V} \qquad \text{[Math. 4]}$$

and a word vector of a word v is set as $e_v$. $d_2$ is the dimension of the word vector. f is set as any neural network that projects a $d_1$-dimensional vector onto a $d_2$-dimensional vector. For example, linear transformation may be used. In this event, a function considering the word vector is expressed as follows:

$$L_{WELM} = -\frac{1}{l} \sum_{1 \le t \le l} \log \frac{\exp(e_{x_t}^T f(z_t))}{\sum_v \exp(e_v^T f(z_t))}.$$ [Math. 5]

Similar to the masked language model, $L_{WELM}$ is a function representing predictability of the t-th word $x_t$ from projection $f(z_t)$ of intermediate representation.

Further, as another function, $$L_{WENorm} = \frac{1}{l} \sum_{1 \le t \le l} |f(z_t) - e_{x_t}|_2^2$$ [Math. 6]

may be used. $L_{WENorm}$ is a function representing a distance between the projection $f(z_t)$ of the intermediate representation and the word vector of the t-th word $x_t$.

Although two types of functions are exemplified here, any function can be used as long as the learning proceeds such that the intermediate representation becomes similar to the word vector of the t-th word $x_t$.

According to the learning apparatus 10 of the present embodiment, the parameter updating using the word vector is applied to the pre-learning 2. In a domain to which the target task belongs, learning the language model itself is computationally expensive, but the cost of learning the word vector is low, and thereby, it is relatively easy to obtain a word vector specialized in the domain. Then, by using the word vector specialized in the domain, the depth of learning by the pre-learning 2 is improved, and a language model with higher performance can be obtained.

For example, in a general word vector learning method, a language model including two layers of an input layer and an output layer is used. On the other hand, the pre-learned language model includes a super-multilayer neural network, and for example, BERT is a neural network including 14 layers in which a word embedding layer (input layer) and an output layer are combined with a neural network including 12 layers. Thus, the word vector can be learned with a smaller number of data items than the language model, and the calculation cost per data item is also small.

According to the technology of the present embodiment, it is possible to learn a language model capable of accurately solving a target task by performing pre-learning in consideration of a word vector using a word vector expressing meaning of a word in a target task domain separately acquired with respect to the pre-learned language model using the masked language model.

The present embodiment is characterized in that a word vector easy to learn is used, as compared with a case where the language model 112 is learned by the pre-learning 2 in related art. The ability to learn from a small amount of data is an important feature in the settings of the pre-learning 2 in which learning is performed using texts of a domain of a target task having only a small amount. The present embodiment has an effect of efficiently learning the meaning and the like of the word in the domain even from a small amount of data by explicitly learning similarity with the word vector when the pre-learning 2 is performed.

Furthermore, the present embodiment can also be applied to the pre-learning 1 in related art. In a case where the present embodiment is applied to the pre-learning 1 in related art, an effect of reducing the enormous calculation time and corpus amount necessary for the pre-learning 1 by using the word vector can be obtained. In addition, the objective function of the present embodiment is regarded as regularization using word vectors, and thus, there is an effect that generalization of learning proceeds and performance in an objective task is improved. Hereinafter, the pre-learning 1 will be referred to as "pre-learning 1 in related art" or "pre-learning 1 according to the present embodiment" in a case where it is necessary to distinguish between the related art and the present embodiment. The description common to both is referred to as "pre-learning 1".

Furthermore, in the learning of the word vector, for example, an amount of the corpus (text data) to be used for learning fastText[5] can be made larger than a total amount of corpuses to be used for learning the language model. By using a larger corpus for learning, it is considered that the word vector can acquire knowledge that cannot be learned by the language model.

First Modification

Word segmentation of the language model and word segmentation of the word vector may have different granularities. This is because many language models adopt a subword as the granularity of word segmentation. For example, while a word "suddenly" is not divided in word segmentation of the word vector and there is a vector corresponding to "suddenly", there is a case where the word "suddenly" is further divided into "sudden" and "ly" in word segmentation by the language model. As described above, a modification corresponding to a case where a word sequence X is divided to have a finer granularity than a word as a result of word segmentation by the language model will be described.

Figure 7:
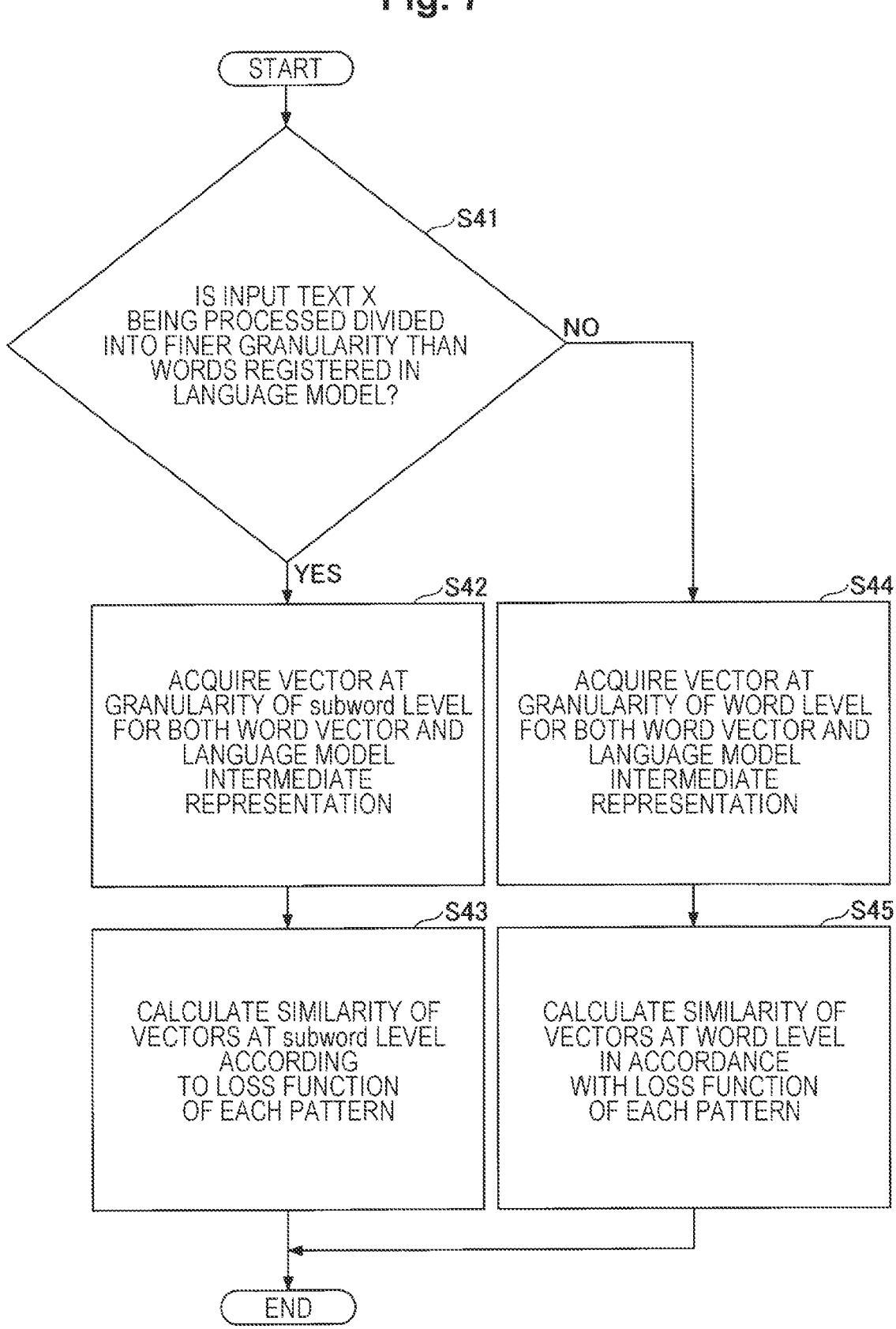
FIG. 7 is a flowchart illustrating an example of a flow of similarity calculation processing according to a first modification.

FIG. 7 is a flowchart illustrating an example of a flow of similarity calculation processing according to a first modification. The first modification is an example of a case where a learning method capable of acquiring a word vector in units of subwords such as fastText is adopted.

In the similarity calculation according to the first modification, the parameter update unit 16 determines whether or not the input text X being processed is divided to have a finer granularity than the words registered in the language model 112 (step S41). In a case where the parameter update unit 16 determines that the input text X is divided to have a finer granularity (step S41: Yes), the parameter update unit 16 acquires a vector at a granularity of a subword level for both the word vector and the language model intermediate representation (step S42). Then, the parameter update unit 16 calculates similarity of the vectors at the subword level according to the loss function of each pattern described above (step S43).

In addition, in a case where the parameter update unit 16 determines that the input text X is not divided to have a finer granularity (step S41: No), the parameter update unit 16 acquires a vector at a granularity of a word level for both the word vector and the language model intermediate representation (step S44). Then, the parameter update unit 16 calculates similarity of the vectors at the word level according to the loss function of each pattern described above (step S45).

Figure 8:
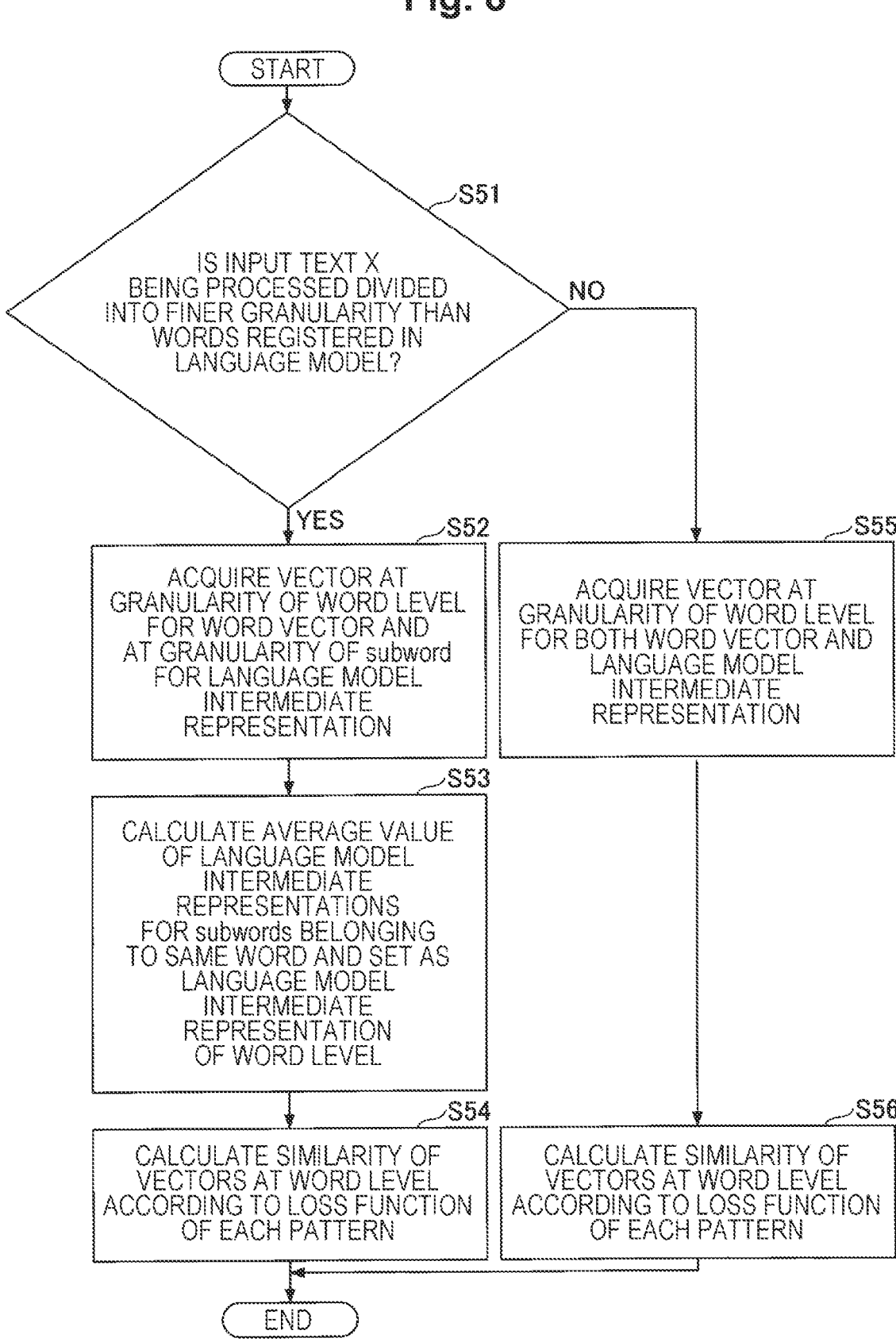
FIG. 8 is a flowchart illustrating an example of a flow of similarity calculation processing according to a second modification.

FIG. 8 is a flowchart illustrating an example of a flow of similarity calculation processing according to a second modification. The second modification is an example of a case where a learning method not capable of acquiring a word vector in units of subwords is adopted.

In the similarity calculation according to the second modification, the parameter update unit 16 determines whether or not the input text X being processed is divided to have a finer granularity than the words registered in the language model 112 (step S51). In a case where the parameter update unit 16 determines that the input text X is divided to have a finer granularity (step S51: Yes), the parameter update unit 16 acquires a word vector at a granularity of a word level and acquires a language model intermediate representation at a granularity of a subword level (step S52).

Then, the parameter update unit 16 calculates an average value of the language model intermediate representations for the subwords belonging to the same word, and sets the average value as the language model intermediate representation at the word level (step S53). The parameter update unit 16 calculates similarity of the vectors at the word level according to the loss function of each pattern described above (step S54).

In addition, in a case where the parameter update unit 16 determines that the input text is not divided to have a finer granularity (step S51: No), the parameter update unit 16 acquires a vector at a granularity of a word level for both the word vector and the language model intermediate representation (step S55). Then, the parameter update unit 16 calculates similarity of the vectors at the word level according to the loss function of each pattern described above (step S56).

Note that $L_{WELM}$ and $L_{WENorm}$ calculate an average value for all words, but target words to be calculated may be narrowed down. For example, an aggregate of target words is set as S, and the number of words included in S in the word sequence X is set as m. In this event, each function may be defined as follows:

$$L_{WELM} = -\frac{1}{m}\sum\nolimits_{1 \le t \le l,\, x_t \in S} \log \frac{\exp\!\left(e_{x_t}^T f(z_t)\right)}{\sum_v \exp\!\left(e_v^T f(z_t)\right)} \qquad [\text{Math. 7}]$$

$$L_{WENorm} = \frac{1}{m}\sum\nolimits_{1 \le t \le l,\, x_t \in S} \left| f(z_t) - e_{x_t} \right|_2^2 \qquad [\text{Math. 8}]$$

As the aggregate S of the target words, "a low-frequency word whose number of times of appearance is less than or equal to a threshold", "a word that is more finely divided than a word in word segmentation of a language model", or the like, can be adopted. As a result, it is possible to avoid adversely affecting a functional word unrelated to the domain such as "is" or a word sufficiently learned in the pre-learning 1.

At the time of learning, the function is used while a function considering a word vector is added to the loss function of the original masked language model. For example, $L_{WELM} + \lambda L_{WENorm}$. $\lambda$ is a hyperparameter indicating intensity for considering a word vector, and is, for example, 1.

Figure 9:
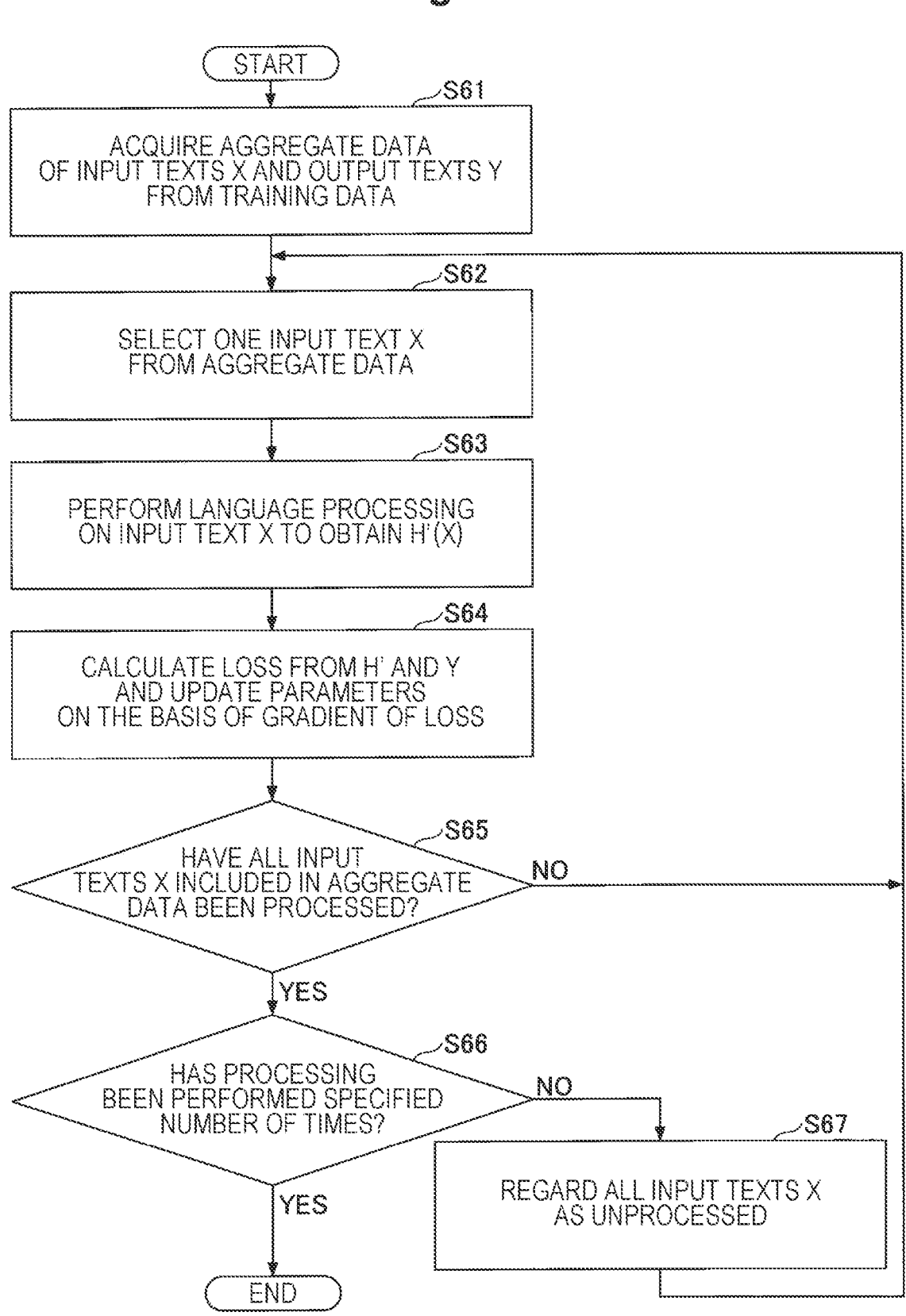
FIG. 9 is a flowchart illustrating an example of a flow of parameter update processing of Fine-Tuning.

FIG. 9 is a flowchart illustrating an example of a flow of parameter update processing of Fine-Tuning. Fine-Tuning is processing of adjusting the language model 112 learned by the pre-learning 2 (specifically, deleting or adding a layer from or to the learned language model in accordance with the target task and then performing relearning using training data of the target task) so that processing specialized for the target task can be performed.

The acquisition unit 12 acquires aggregate data of the input texts X and the output texts Y from the training data 30 (step S61). Next, the learning apparatus 10 selects one input text X from the aggregate data as a processing target (step S62).

The conversion unit 14 performs language processing on the input text X to obtain a feature amount sequence H'(X)

(step S63). Note that a form of the feature amount sequence score H'(X) at the time of Fine-Tuning differs depending on the target task.

The parameter update unit 16 calculates a loss from the feature amount sequence H'(X) and the output text Y and updates, the parameters based on a gradient of the loss (step S64).

The learning apparatus 10 determines whether or not all the input texts X included in the aggregate data have been processed (step S65). In a case where the learning apparatus 10 determines that any of the input texts X included in the aggregate data is not processed (step S65: No), the processing returns to the processing in step S62, and the learning apparatus 10 selects the next input text X.

In a case where the learning apparatus 10 determines that all the input texts X included in the aggregate data have been processed (step S65: Yes), the learning apparatus 10 further determines whether processing has been performed a specified number of times (step S66). In a case where the learning apparatus 10 determines that the processing has not been performed the specified number of times (step S66: No), the learning apparatus 10 regards all the input texts X as unprocessed (step S67), and the processing returns to step S62.

In a case where the learning apparatus 10 determines that the processing has been performed the specified number of times (step S66: Yes), the processing ends.

Hardware Configuration Example

The learning apparatus 10 can be implemented, for example, by causing a computer to execute a program describing processing content described in the present embodiment. Note that the "computer" may be a physical machine or virtual machine on a cloud. In a case where virtual machine is used, "hardware" described herein is virtual hardware.

The above program can be stored and distributed by being recorded in a computer-readable recording medium (portable memory or the like). Furthermore, the above program can also be provided through a network such as the Internet or e-mail.

Figure 10:
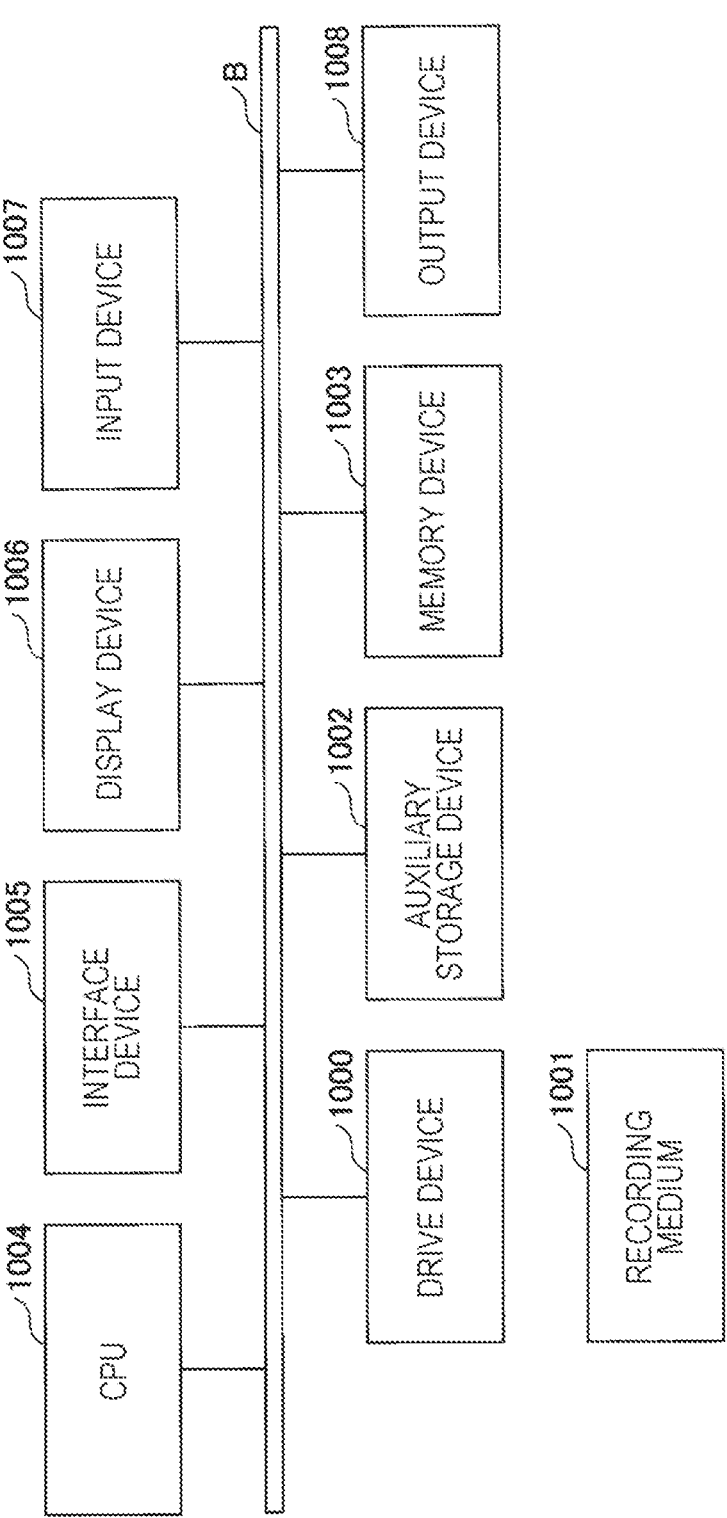
FIG. 10 is a view illustrating a hardware configuration example of the learning apparatus.

FIG. 10 is a view illustrating a hardware configuration example of the computer. The computer of FIG. 10 includes a drive device 1000, an auxiliary storage device 1002, a memory device 1003, a CPU 1004, an interface device 1005, a display device 1006, an input device 1007, an output device 1008, and the like, which are connected to each other by a bus B.

The program for implementing the processing in the computer is provided by, for example, a recording medium 1001 such as a CD-ROM or a memory card. If the recording medium 1001 storing the program is set in the drive device 1000, the program is installed from the recording medium 1001 to the auxiliary storage device 1002 via the drive device 1000. However, the program is not necessarily installed from the recording medium 1001, and may be downloaded from another computer via a network. The auxiliary storage device 1002 stores the installed program and also stores necessary files, data, and the like.

In a case where an instruction to start the program is made, the memory device 1003 reads and stores the program from the auxiliary storage device 1002. The CPU 1004 implements a function related to the device in accordance with a program stored in the memory device 1003. The interface device 1005 is used as an interface for connecting to the network. The display device 1006 displays a graphical user interface (GUI) or the like by the program. The input device 1007 includes a keyboard and mouse, buttons, a touch panel, or the like, and is used to input various operation instructions. The output device 1008 outputs a computation result. Note that the computer may include a graphics processing unit (GPU) instead of the CPU 1004 and may include the GPU in addition to the CPU 1004. In that case, for example, the processing may be shared and executed such that the GPU executes processing requiring special operations such as a neural network and the CPU 1004 executes the other processing.

Experimental Results

Experiments were performed on a BioASQ5b dataset [6] of question answering tasks in a medical domain. The results are as indicated in Table 1. Evaluation indicators are SACC as an accuracy rate of top-1 prediction, LACC as a rate at which top-5 prediction includes correct answers, and MRR as an average of reciprocals of ranks of the correct answers. In all, a higher number indicates a better performance.

TABLE 1

| Used language model | SACC | LACC | MRR |
|---|---|---|---|
| (1) Language model [2] by only pre-learning 1 | 40.4 | 54.0 | 46.1 |
| (2) Model [3] dedicated to domain | 46.7 | 60.7 | 52.4 |
| (3) Language model [1] of related art | 41.3 | 56.0 | 46.9 |
| (4) Language model in which present embodiment ($L_{WELM}$) is applied to pre-learning 2 | 42.7 | 56.2 | 47.9 |
| (5) Language model in which present embodiment ($L_{WENorm}$) is applied to pre-learning 2 | 42.4 | 59.6 | 49.2 |

Compared methods are (1) a simplest method (pre-learning 1 in related art+Fine-Tuning), (2) a model dedicated to a domain using a large amount of calculation resources (pre-learning 1+Fine-Tuning in the domain corpus), and (3) related art (pre-learning 1 in related art+pre-learning 2 in related art+Fine-Tuning).

Furthermore, the methods according to the present embodiment are (4) and (5), and both are (pre-learning 1 in related art+pre-learning 2 according to the present embodiment+Fine-Tuning).

The model dedicated to the domain performs pre-learning specialized in the domain, and thus, the performance of the model dedicated to the domain greatly exceeds the performance of the other models. The related art exceeds the performance of the simplest method by performing the pre-learning 2, but does not reach the performance of the model dedicated to the domain.

The learning apparatus 10 according to the present embodiment performing pre-learning in consideration of word vectors instead of performing the pre-learning 2 achieved performance superior to the related art and successfully reduced a difference from the model dedicated to the model.

In addition, regarding the calculation time, in the present embodiment, similarly to the related art, calculation was completed within at most one day using one GTX1080 Titan GPU (11 GB). Note that the model dedicated to the domain [3] requires calculation for 10 days or more using eight V100 GPUs (16 GB).

In addition, it could be confirmed that when using fastText disclosed as word vectors, and performing learning by the learning device 10 according to the present embodiment as a substitute for the pre-learning 1 in related art: BERT, the performance exceeded the performance of BERT. Specifically, in SQuAD[7] of the question answering tasks in a Wikipedia domain, the performance of BERT and the performance of the learning apparatus 10 according to the present embodiment in SQuAD were respectively 81.97% and 82.29% in a complete matching rate, and 89.34% and 89.50% in a partial matching rate (F1).

The learning of fastText is much lower in cost than the learning of BERT, and thus, learning can be performed using a corpus of an amount that cannot be learned by BERT, and as a result, it is estimated that knowledge that cannot be acquired by BERT can be learned. Note that the learning corpus of BERT included 3 B tokens, whereas the learning corpus of fastText included 600 B tokens.

In the pre-learning 2 in related art, a learning method originally premised on learning for an enormous corpus is applied to a small amount of corpus (an aggregate of input texts of training data of a target task), and thus, improvement in performance is considered to be limited.

In order to efficiently insert knowledge of a domain of a target task into a language model from a small corpus, the learning apparatus 10 according to the present embodiment uses word vectors specialized in the domain of the target task. By obtaining the word vector from the training data of the target task, it is possible to obtain the word vector expressing the meaning of the word in the target domain task. Furthermore, in the pre-learning 2, learning is performed such that the intermediate representation of the language model includes information on the word vector, and thereby, efficient learning with a small amount of corpus is achieved.

Note that, in the present embodiment, an Encoder-type language model (available for a target task such as text classification or text extraction) has been mainly described as an example, but the present invention can also be applied to an Encoder-Decoder-type language model (available for a target task such as text generation).

REFERENCE LITERATURE

[1] Suchin Gururangan, Ana Marasovic, SwabhaSwayamdipta, Kyle Lo, Iz Beltagy, Doug Downey, and Noah A. Smith. Don't stop pretraining: Adapt language models to domains and tasks. In ACL, pp. 8342-8360, July 2020. (Non-Patent Literature 1)

[2] Jacob Devlin, Ming-Wei Chang, Kenton Lee, and Kristina Toutanova. BERT: Pre-training of deep bidirectional transformers for language understanding. NAACL-HLT, pp. 4171-4186, 2019.

[3] Jinhyuk Lee, Wonjin Yoon, Sungdong Kim, Donghyeon Kim, Sunkyu Kim, Chan Ho So, and Jaewoo Kang. Biobert: a pre-trained biomedical language representation model for biomedical text mining. Bioinformatics, Vol. 36, No. 4, pp. 1234-1240, 2020.

[4] Tomas Mikolov, Greg Corrado, Kai Chen, and Jeffrey Dean. Efficient Estimation of Word Representations in Vector Space, pp. 1-12, 2013.

[5] Piotr Bojanowski, Edouard Grave, Armand Joulin, and Tomas Mikolov. Enriching word vectors with subword information. Transactions of the Association for Computational Linguistics, Vol. 5, pp. 135-146, 2017.

[6] George Tsatsaronis, Georgios Balikas, Prodromos Malakasiotis, Ioannis Partalas, Matthias Zschunke, Michael R Alvers, Dirk Weissenborn, Anastasia Krithara, Sergios Petridis, Dimitris Polychronopoulos, Yannis Almirantis, John Pavlopoulos, Nicolas Baskiotis, Patrick Gallinari, Thierry Artieres, Axel Ngonga, Norman Heino, Eric Gaussier, Liliana Barrio-Alvers, Michael Schroeder, Ion Androutsopoulos, and Georgios Paliouras. An overview of the BIOASQ large-scale biomedical semantic indexing and question answering competition. BMCBioinformatics, Vol. 16, p. 138, 2015.

[7] Pranav Rajpurkar, Jian Zhang, Konstantin Lopyrev, and Percy Liang. SQuAD: 100,000+ questions for machine comprehension of text. In EMNLP, pp. 2383-2392, 2016.

SUPPLEMENTS

The present specification discloses at least a learning apparatus, a learning method, a program, and a storage medium according to each of the following supplementary notes.

Supplement 1

A learning apparatus including:
a memory; and
at least one processor connected to the memory;
in which the processor is configured to:
convert an input text data into a feature amount sequence based on a language model, and
update parameters of the language model based on the text data, the feature amount sequence, and a word vector learned in advance.

Supplement 2

The learning apparatus according to supplement 1,
in which the word vector is learned in advance based on a general corpus, and
an amount of the corpus is greater than a total amount of the input text data.

Supplement 3

The learning apparatus according to supplement 1,
in which a domain of the input text data is the same as a domain of text data to be processed in a target task.

Supplement 4

The learning apparatus according to any one of supplements 1 to 3,
in which the processor is further configured to:
in a case where the word vector includes word vectors of subwords obtained by dividing a word, and the language model divides the text data to have a finer granularity than a word, update the parameters of the language model based on the word vectors of the subwords.

Supplement 5

The learning apparatus according to any one of supplements 1 to 3,
in which the processor is further configured to:
in a case where the language model divides the text data to have a finer granularity than a word, update the parameters of the language model based on an average value of intermediate representations of the language model and the word vector for subwords belonging to a same word.

Supplement 6

A learning method to be executed by a computer, the method including:
a step of converting input text data into a feature amount sequence based on a language model; and
updating parameters of the language model based on the text data, the feature amount sequence, and a word vector learned in advance.

Supplement 7

A program for causing a computer to function as each unit of the learning apparatus according to any one of supplements 1 to 5.

Supplement 8

A non-transitory storage medium storing a program executable by a computer to execute learning processing, the computer performing, in the learning processing, converting input text data into a feature amount sequence based on a language model, and
updating parameters of the language model on the basis the text data, the feature amount sequence, and a word vector learned in advance.

Although the present embodiment has been described above, the present invention is not limited to such a specific embodiment, and various modifications and changes can be made within the scope of the gist of the present invention described in the claims.

REFERENCE SIGNS LIST

10 Learning apparatus
11 Storage unit
12 Acquisition unit
13 Mask unit
14 Conversion unit
15 Word vector acquisition unit
16 Parameter update unit
20 Corpus
30 Training data

The invention claimed is:
1. A learning apparatus comprising:
a memory; and
at least one processor connected to the memory,
wherein the processor configured to:
convert input text data into a feature amount sequence of the input text data based on a language model, wherein the language model is pre-trained in a first subject domain; and
update, as training of the language model, parameters of the language model based on the text data, the feature amount sequence of the input text data, and a word vector,
  wherein the word vector is learned in advance in a second subject domain, the second subject domain is a part of the first subject domain, the word vector represents semantics of a word in the second subject domain, thereby the language model with the updated parameters as trained performing a target task of the second subject domain with accuracy, and
in a case where the word vector includes word vectors of subwords obtained by dividing a word, and the language model divides the text data to have a finer granularity than a word, update the parameters of the language model based on the word vectors of the subwords.

2. A learning apparatus comprising:

a memory; and at least one processor connected to the memory, wherein the processor configured to:

convert input text data into a feature amount sequence of the input text data based on a language model, wherein the language model is pre-trained in a first subject domain; and update, as training of the language model, parameters of the language model based on the text data, the feature amount sequence of the input text data, and a word vector, wherein the word vector is learned in advance in a second subject domain, the second subject domain is a part of the first subject domain, the word vector represents semantics of a word in the second subject domain, thereby the language model with the updated parameters as trained performing a target task of the second subject domain with accuracy, and in a case where the language model divides the text data to have a finer granularity than a word, update the parameters of the language model based on an average value of intermediate representations of the language model and the word vector for subwords belonging to a same word.

3. A learning method to be executed by a computer including a memory and at least one processor connected to the memory, the method comprising:

converting input text data into a feature amount sequence of the input text data based on a language model, wherein the language model is pre-trained in a first subject domain; and updating, as training of the language model, parameters of the language model based on the text data, the feature amount sequence of the input text data, and a word vector, wherein the word vector is learned in advance in a second subject domain, the second subject domain is a part of the first subject domain, the word vector represents semantics of a word in the second subject domain, thereby the language model with the updated parameters as trained performing a target task of the second subject domain with accuracy, and in a case where the word vector includes word vectors of subwords obtained by dividing a word, and the language model divides the text data to have a finer granularity than a word, update the parameters of the language model based on the word vectors of the subwords.

4. A non-transitory computer-readable recording medium having computer-readable instructions stored thereon, which, when executed, cause a computer to function as the learning apparatus according to claim 1.

5. The learning apparatus according to claim 1, wherein the word is at least a part of the input text data.

6. The learning apparatus according to claim 1, wherein the word vector is learned in advance by using another corpus, said another corpus comprises more text data than the corpus, thereby the word vector capturing a knowledge that the pre-trained language model lacks.

7. The learning apparatus according to claim 1, wherein the word vector is learned in advance based on a general corpus, and an amount of the corpus is greater than a total amount of the input text data.

8. The learning apparatus according to claim 1, wherein a domain of the input text data is the same as a domain of text data to be processed in a target task.

* * * * *